(12) United States Patent
Gaither et al.

(10) Patent No.: US 10,133,813 B2
(45) Date of Patent: Nov. 20, 2018

(54) FORM VALUE PREDICTION UTILIZING SYNONYMOUS FIELD RECOGNITION

(71) Applicant: ADOBE SYSTEMS INCORPORATED, San Jose, CA (US)

(72) Inventors: Shawn Alan Gaither, Raleigh, NC (US); Eylon Stroh, San Carlos, CA (US); Priyank Mathur, San Jose, CA (US); Randy Swineford, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 617 days.

(21) Appl. No.: 14/824,939

(22) Filed: Aug. 12, 2015

(65) Prior Publication Data

US 2017/0046622 A1 Feb. 16, 2017

(51) Int. Cl.
*G06F 17/30* (2006.01)
*G06F 17/27* (2006.01)

(52) U.S. Cl.
CPC .... *G06F 17/30699* (2013.01); *G06F 17/2795* (2013.01)

(58) Field of Classification Search
CPC ........... G06F 17/30699; G06F 17/2795; G06F 17/30867; G06N 7/005
USPC ......................................................... 706/48
See application file for complete search history.

(56) References Cited

U.S. PATENT DOCUMENTS

| | | | | |
|---|---|---|---|---|
| 6,651,217 B1* | 11/2003 | Kennedy | ............... | G06F 17/243 715/224 |
| 8,234,561 B1* | 7/2012 | Bourdev | ............. | G06F 17/2785 715/224 |
| 2002/0062342 A1* | 5/2002 | Sidles | ................... | G06F 17/243 709/203 |
| 2004/0030917 A1* | 2/2004 | Karamchedu | ......... | G06F 21/606 726/3 |
| 2005/0289114 A1* | 12/2005 | Bellamy | ........... | G06F 17/30011 |
| 2006/0200754 A1* | 9/2006 | Kablesh | ................ | G06F 17/243 715/226 |
| 2008/0235567 A1* | 9/2008 | Raj | ........................ | G06F 17/243 715/226 |
| 2010/0211863 A1* | 8/2010 | Jones | .................... | G06F 17/243 715/224 |

* cited by examiner

*Primary Examiner* — Dave Misir
(74) *Attorney, Agent, or Firm* — Shook, Hardy & Bacon, L.L.P.

(57) ABSTRACT

Embodiments of the present invention provide systems, methods, and computer storage media directed at predicting values for an electronic form. In embodiments, the method can include forming synonym groupings of form field labels for a number of users. The synonym groupings can be based on an analysis of the similarity of form field values that are associated with form field labels. In embodiments a predictive model may be generated from these synonym groupings. The predictive model can correlate the synonym groupings of one user with synonym groupings of one or more additional users to enable a determination of one or more predicted form field values for the one user based on a queried form field label even though the one user may have never submitted an electronic form with the queried form field label. Other embodiments may be described and/or claimed.

20 Claims, 5 Drawing Sheets

FORM VALUE PREDICTION UTILIZING SYNONYMOUS FIELD RECOGNITION

BACKGROUND

As the digital age soldiers on, individuals are continuously presented with electronic forms requesting information about the individuals. These electronic forms could be order forms, survey forms, contact forms, etc. Entering information into these electronic forms can be tedious and time consuming, especially on mobile devices that have small keyboards that are typically presented on an interactive display.

Because of the tedious and time consuming nature of completing electronic forms, technologies such as autocomplete and autofill have been developed to make it easier for a user to enter values into fields within these electronic forms in response to labels contained within the electronic forms. These technologies, however, generally require that the user manually enter values for any labels that are encountered for the first time by that user. This is because these technologies rely on previous values that were input by that user for associated labels. As such, if the user has not previously input a value for a label, these technologies are not able to aid the user in completing the value for that label, which limits the effectiveness of these technologies.

SUMMARY

Embodiments of the present invention are directed at predicting form field values for a user even when that user has not yet encountered the form field label associated with those form field values. In embodiments, this is accomplished by utilizing synonym groupings for each user of an array of users. Each of these synonym groupings can correlate form field labels that have had the same or similar values input by the respective user These synonym groupings for the array of users can then be utilized to train a predictive model that is capable of determining a set of form field label synonyms based on a given form field label. Because the predictive model utilizes synonym groupings from an array of users, it is able to determine form field label synonyms for a given form field label even though the specific user completing the form may not have previously submitted a value for the given form field label. As such, when a user encounters a particular form field label that the user has not previously submitted a value for, the predictive model can be utilized to determine a set of form field label synonyms for that particular form field label. Each of these form field label synonyms can be checked against the form field labels that have had values submitted by that user to determine predicted form field values for the particular form field label for that user.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

DETAILED DESCRIPTION

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As mentioned above, individuals are continuously presented with electronic forms requesting information about the individuals. These electronic forms could be order forms, survey forms, contact forms, etc. Entering information into these electronic forms can be tedious and time consuming, especially on mobile devices that have small keyboards that are typically presented on an interactive display.

Because of the tedious and time consuming nature of completing electronic forms, technologies such as autocomplete and autofill have been developed to make it easier for a user to enter values into fields within these electronic forms in response to labels contained within the electronic forms. As mentioned above, these technologies, however, generally require that the user manually enter values for any labels that are encountered for the first time by that user, which limits the effectiveness of these technologies. Alternatively, labels may have been manually standardized to a known set of canonized labels during the authoring process.

Embodiments of the present invention are directed at predicting form field values for a user even when that user has not yet encountered the form field label associated with those predicted form field values. In embodiments, this is accomplished by gathering information on form field labels and associated form field values for an array of users. From this information, synonym groupings for a user can be generated by grouping form field labels that have had a same or similar value input by the user. These synonym groupings can be formed for each user of the array of users. The synonym groupings for the array of users can then be utilized to train a predictive model that is capable of determining a set of form field label synonyms based on a given form field label. Because the predictive model utilizes synonym groupings from an array of users, it is able to determine form field label synonyms for a given form field label even though the specific user completing the form may not have previously submitted a value for the given form field label. As such, when a user encounters a particular form field label that the user has not previously submitted a value for, the predictive model can be utilized to determine a set of form field label synonyms for that particular form field label. Each of these form field label synonyms can be checked against the form field labels that have had values submitted by that user to determine predicted form field values for the particular form field label for that user.

Figure 1:
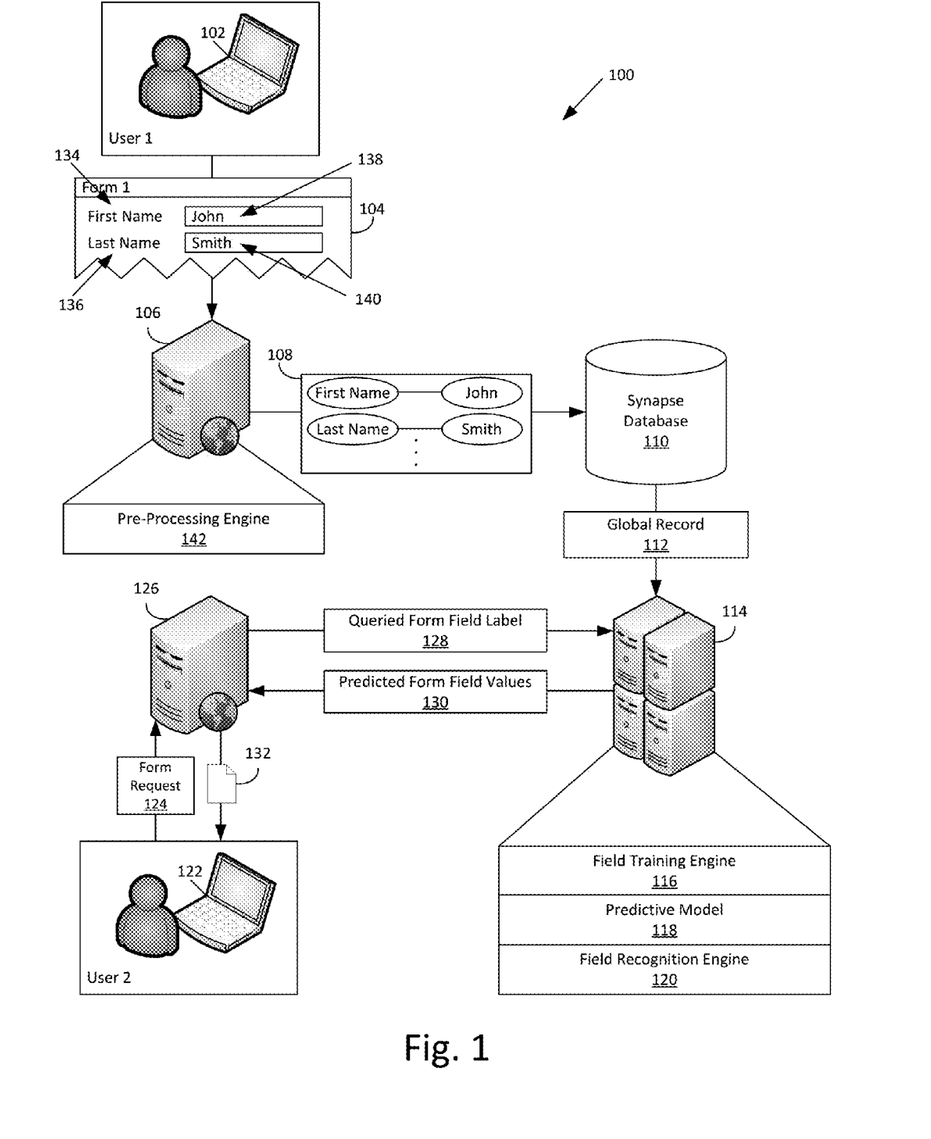
FIG. 1 depicts an illustrative computing environment in which embodiments of the present disclosure may be employed.

FIG. 1 depicts an illustrative computing environment 100 in accordance with various embodiments of the present invention. As depicted, computing environment 100 includes client computing devices 102 and 122, web application servers 106 and 126, a synapse database 110, and one or more application server(s) 114. Each of these components may be coupled with one another via any network including any wired or wireless network, or any combination thereof, such as, for example, the Internet. In addition, it will be appreciated that the depiction of each of the above devices and servers is merely meant to be illustrative in nature and that the composition of the items depicted in FIG. 1, and described below, is selected for purposes of explanation and should not be treated as limiting of this disclosure.

In embodiments, client computing device 102 may be associated with a user (e.g., User 1). User 1 can utilize client computing device 102 to submit one or more electronic forms to web application server 106. As used herein, an electronic form would include any form stored in a digital format, whether that form originated in a digital format (e.g., Hypertext Markup Language (HTML) forms) or was generated from a physical form (e.g., scanned in). Each electronic form comprises a number of form field labels that are each associated with a form field value entry point. The form field labels designate what information is being sought from a user while the form field value entry points provide a mechanism by which the user is able to enter the sought after information as a form field value. The form field labels and form field value entry points may be explicitly specified as part of the electronic form, or the form field labels and form field value entry points may be inferred from the electronic form. Such an inference may be accomplished utilizing pre-processing engine 142, a field identification engine (not depicted), or any other suitable component. In some embodiments, this inference may be further accomplished utilizing optical character recognition (OCR) technology to aid in identification of the form field labels. It will be appreciated that OCR technology may be utilized, in some embodiments, to accomplish various aspects of the invention described herein.

An example form is depicted by the excerpted portion of form 104. Form 104 comprises form field labels 134 and 136 and form field value entry points depicted by the text boxes adjacent to the respective form field labels. It will be appreciated that, while the form field value entry points are depicted as text boxes, there are many mechanisms that could be utilized as form field value entry points depending on the information sought by the form. Such other form field value entry point mechanisms would include, but are not limited to, radio buttons, checkboxes, drop down menus, or any other suitable mechanism for data entry. As can be seen, User 1 has completed form 104 with the field label values 138 and 140 to satisfy the information sought by the form field labels 134 and 136, respectively. As can be seen, once form 104 is completed by User 1, User 1 may submit form 104 to web application server 106 via client computing device 102.

Web application server 106 can be configured to receive form 104 from client computing device 102. In embodiments, web application server 106 may also be configured with a pre-processing engine 142 to pre-process data extracted from form 104. Such a pre-processing engine 142 may be configured to generate a set of synapses 108 from form 104. A synapse, as used herein, includes an association between a form field label and a form field value. In some cases field recognition engine 120 could also be utilized at this stage of the processing to determine a confidence value associated with the label. This could be beneficial in cases where label detection may reflect potential errors during detection. In such cases, alternate labels, associated with form field value entry points, may also be provided in the set of synapses 108. These alternate labels may be provided as additional nodes of synapses 108 or may be provided as metadata associated with synapses 108. As can be seen in synapses 108, pre-processing engine 142 has generated a synapse that associates form field label 134 with form field value 138 submitted by User 1, and has associated form field label 136 with form field value 140 submitted by User 1.

In some embodiments, pre-processing engine 142 may also be configured to obfuscate the form field values extracted from form 104. This obfuscation may be beneficial to, for example, preserve User 1's information, especially personally identifiable information (PII). As will become apparent in the discussion below, such obfuscation would be selected to preserve the ability to compare the similarity of form field values submitted by User 1, while making the form field values themselves indecipherable. This may be accomplished, for example, by applying a hash function and/or encryption algorithm to the form field values submitted by the user. In such embodiments, the obfuscation can be specific to the user that submitted the form field values. For example, for an encryption algorithm, user specific keys may be utilized in applying the encryption algorithm. For a hash function, a user specific seed may be utilized. Such user specific obfuscation would prevent the ability to determine actual form field values submitted by one user by comparing obfuscated form field values for that one user to obfuscated form field values for another user whose actual form field values are known. For example, consider User 1. User 1 has entered "John" as User 1's first name. If the obfuscation of "John" were the same obfuscation used for a second user with the first name "John," then the obfuscated form field values for both users would be the same. As such, if a person knows that the second user's name is John and that the second user's obfuscated form field value is the same as that of User 1, then the person can deduce that User 1's name is John.

Pre-processing engine 142 may also be configured to obfuscate the form field labels extracted from form 104. Such obfuscation would provide an additional layer of protection to a user's information by making it more difficult for a nefarious user to determine the form field label that is associated with the form field values, thereby making it more difficult to determine possible form field values. In addition, such obfuscation may protect any form field values that may be inadvertently interpreted as a form field label. For example, a pre-populated form field value could be mistaken as form field label, rather than a form field value. As will become apparent in the discussion below, such obfuscation would be selected to preserve the ability to compare the similarity of form field labels across various users, while making the form field labels themselves indecipherable. As such, form field labels may be globally obfuscated via, for example, an encryption algorithm and/or a hash function that is the same across users.

In some instances, pre-processing engine 142 may also be configured to normalize the form field labels and/or values extracted from form 104. Such a normalization may include removal of various special characters, such as, for example, '<', '>', '=', '!'; conversion of special characters to a word equivalent, such as, for example, '&' to 'and'; removal of white space, such as spaces between words; conversion of numeric words to numbers, etc. Such normalization may reduce variations among labels. As an example "Last Name," "last-name," and "last_name" could be normalized to "lastname." As another example "Zip Code," "zip-code," and "zip_code" could be normalized to "zipcode." In additional embodiments, such normalization may include stemming and/or lemmatization, which are known in the art. In such embodiments, the stemming and/or lemmatization could be utilized to, for example, remove suffixes, or the like, from words occurring within labels. This may ensure words within labels that differ only in, for example, plural ending or verb tense would map to the same token, or label.

In some embodiments, pre-processing engine 142 may perform natural language processing on the form field labels to derive possible synonyms for the form field labels, or other words related to the form field labels. These form field label synonyms and/or related words may be included in synapses 108 with the form field label of the respective synapse to which it is associated or may be included as metadata to the synapse. These form field label synonyms and/or related words could be utilized to increase the accuracy of predictive model 118, discussed in greater detail below.

In some embodiments, pre-processing engine 142 may also be configured to de-duplicate form field labels for a user. This de-duplication may be accomplished, in some embodiments, by, for example, storing a count of occurrences normalized by confidence. This de-duplication may remove form field labels that appear multiple times and are associated with a same or similar form field value from the synapses associated with a specific user. Such de-duplication may be beneficial to conserve resource consumption, such as, for example, processor cycles, memory, bandwidth, etc., by reducing the number of synapses that need to be processed.

While the above discussed pre-processing has been described in reference to web application server 106, it will be appreciated that any of this pre-processing could be performed by synapse database 110 and/or application server 114, or another computing device or set of computing devices, depending on the implementation.

Regardless of the various pre-processing procedures that are performed, web application server 106 may submit synapses 108 to synapse database 110. In some embodiments, synapse database 110 may persist synapses 108 along with synapses for a plurality of other users. In some of these embodiments, the synapse database 110, or a processing server coupled therewith, can be configured to take synapses 108, along with synapses associated with other users, and form synonym groupings of form field labels for each user. These synonym groupings may, in some embodiments, be formed by generating user specific graphs that group form field labels based on the form field values entered by each user. These graphs can be undirected graphs in some embodiments, or directed graphs in other embodiments, having a node for each form field label and a node for respective form field values. In such embodiments, the nodes that represent form field values that are equal to one another, or within a threshold of similarity from one other, may be reduced down to a single node in the graph such that form field labels that are associated with a same or similar form field value are all associated with the same node within the user specific graph. For example, suppose User 1 has previously entered the form field value "John" to satisfy the form field label "Fore Name." In such an example, the form field value "John" that is associated with the form field label "First Name," discussed above, would be combined with the form field value "John" that is associated with the form field label "Fore Name." This combination would result in both form field labels pointing to the same form field value node in User 1's graph. As such, at least for User 1, these two form field labels would be considered synonymous with one another. In doing this for each user, synonym groupings for each user may be generated. As is apparent from this description, in embodiments where the form field values are obfuscated, the obfuscation would need to preserve the ability to compare similar form field values to enable the formation of these synonym groupings.

The threshold of similarity mentioned above may be a predefined, or preconfigured, threshold and any conventional string analysis mechanisms may be utilized to determine the similarity between two strings. For instance, the synapse database 110, or a processing server coupled therewith, could be configured to calculate the Levenshtein distance between two form field values. If the Levenshtein distance is less than a predefined threshold, then the two form field values would be considered to be the same. Levenshtein distance will be familiar to those of ordinary skill in the art and, therefore, will not be discussed further. It will be appreciated that the Levenshtein distance is merely meant to illustrate an example mechanism for string similarity analysis and that any other mechanism of comparing the similarity of two strings is within the scope of this disclosure. In some embodiments, the form field values may be normalized in a similar manner to that described above in reference to form field labels to accomplish a similar effect. As an example, suppose User 1 has entered both "123 Anywhere Pl. #13" and "123 Anywhere Pl. No. 13," in response to form field label "Address." It may be desirable for these form field values to resolve to the same token, or node, within User 1's graph. Utilizing a threshold of similarity and/or normalization may enable such a resolution.

The synonym groupings of each individual user, while beneficial in predicting a form field value for the user when given a form field label that exists in the user's synonym groupings, is not useful in predicting a form field value for a form field label that is absent from the user's synonym groupings. As used herein, for an item to be absent from a set refers to an item that is not included, or does not exist, within the set. To enable prediction of form field values for form field labels that are absent from a user's synonym groupings, the synapse database 110 may be configured to export the collective synonym groupings for the users to application server 114 as global record 112. The global record 112 may be exported in the form of the synapses discussed above, the graphs discussed above, or any other suitable format that associates form field labels with form field values for the individual users.

As depicted, application server 114 can include a field training engine 116. Field training engine 116 may be configured to process the global record 112 received from synapse database 110, to generate, or train, a predictive model (e.g., predictive model 118) that enables prediction of at least one form field value for a user when given a queried form field label that is absent from the user's synonym groupings. To accomplish this, predictive model 118 may correlate the synonym groupings of one user with those of one or more additional users. In embodiments, this correlation is based, at least in part, on the form field labels contained within the synonym groupings for each of the users. As an example, suppose a first user has a synonym grouping that relates form field label A and form field label B as synonyms and a second user has a synonym grouping that relates form field label B and form field label C as synonyms. Based on this, the predictive model can correlate that form field label C may be a synonym of form field label A because A is synonymous with B for the first user and B is synonymous with C for the second user. As a result, if the first user is presented with a form containing form field label C, the predictive model can enable the form field value of the first user for form field label A to be a predicted form field value for the form field label C of the presented form. This is so, even though form field label C is absent from the first user's synonym groupings. As is apparent from this description, in embodiments where the form field labels are obfuscated, the obfuscation would need to preserve the ability to compare similar form field labels to enable the correlation of form field labels.

It will be appreciated, however, that, merely because a first user has entered the same value for form field label A and form field label B and a second user has entered the same value for form field label B and form field label C, a predictive process may not be able to guarantee the accuracy of the above discussed predicted form field value. For example, suppose the second user works from home. In such an instance, form field labels "street address" and "work address" may be considered to be synonymous for the second user, but this may not hold true for the first user who may not work from home. As such, the predictive model may also enable calculation of a confidence value to associate with any predicted form field value(s). Such a confidence value could be based on any number of factors and could be utilized in ranking any predicted form field value(s). These factors could include the similarity of the labels; actions taken by users with respect to each predicted form field value, such actions are discussed in greater detail below; a time at which each predicted form field value was submitted by the user (e.g., older predicted form field values could be assigned a lower rank than more recent predicted form field values); a count of the number of form field label synonyms that are associated with the predicted form field value, a context of the queried form field label (e.g., in the context of other values that have been entered on form 132), or any other suitable factors. In some embodiments, these factors may be weighted to ensure proper ranking. In such embodiments, the weighting of each factor could be determined via, for example, any suitable machine learning algorithm. It will be appreciated that, while the above mentioned confidence values are discussed as being determined from the predictive model, that these confidence values may be determined in any other manner including, but not limited to, utilizing a different ranking model that could be generated, or trained, by the field training engine 116 utilizing the above discussed factors.

The actions mentioned above with respect to determining a confidence value can be any action that the user could take with respect to the predicted form field value. For example, if the user receives a suggestion of a predicted form field value, but submits a different form field value that was not suggested, then the confidence value for the predicted form field value may be reduced. Such actions may include, for example, (1) suggestion of a predicted form field value followed by either explicit (directly selecting the top choice) or implicit (having a prefilled value which the user chooses not to change) user acceptance of the predicted form field value, which may serve to increase the confidence value; (2) a predicted form field value that is retrieved from the user's own profile, which would be of a high confidence value; (3) a predicted form field value suggested while the user is entering a form field value and selection of the predicted form field value to auto-complete the entry of the form field value, which would increase the confidence value; (4) manual entry of the form field value by the user which would provide a high confidence value for the specific user; (5) suggestion of a predicted form field value followed by user change of the predicted form field value, which may serve to decrease the confidence value. Such an action may be included as part of the synapse or as metadata associated with the synapse.

To generate the above discussed predictive model, field training engine 116 may utilize any suitable training algorithms to correlate form field label synonyms between the synonym groupings. Examples of such training algorithms that can be utilized to accomplish this are PageRank and/or SimRank. In some embodiments, a specific version of Page Rank, Personalized PageRank, may be utilized. These algorithms are known in the art and are merely included as examples of possible algorithms. It will be appreciated that the above mentioned algorithms are merely meant to illustrate possible examples and that any number of algorithms may be utilized in training. In addition, such algorithms may be utilized in conjunction with one another in any combination. For example, the similarity between two form field labels may be calculated utilizing both PageRank and SimRank and the resultant similarity may be determined based on both of these calculations.

The above described process can be utilized to initially generate predictive model 118 or to update predictive model 118 as additional synapses are generated. Updating of predictive model 118 may occur in real time, or on a periodic basis (e.g., weekly, biweekly, monthly, etc.).

Once predictive model 118 has been generated, it can be utilized to predict form field label values for a given user. In embodiments, client computing device 122 may be associated with a user (e.g., User 2). User 2 can utilize client computing device 102 to submit a request for an electronic form, represented here as form request 124, to web application server 126. In response, web application server 126 may generate the requested form for User 2. In so doing, application server 126 may be configured to retrieve predicted form field values for User 2 based on the form field labels contained within the requested form.

In some embodiments, these form field values may be retrieved from a form field profile associated with User 2. This form field profile may reside on web application server 126, on application server 114, on client device 122, any other suitable location, or any combination thereof. Such a form field profile may associate form field labels with form field values that have been entered by User 2. This association may be stored in the form of synapses, but could be stored in any manner that enables this association. If a form field label of the requested form matches a form field label within the form field profile of User 2, then the form field value associated with that form field label may be selected as a predicted form field value. If, however, a form field label of the requested form is absent from the form field profile for User 2 then web application server 126 can be configured to submit the form field label to application server 114 as queried form field label 128.

Application server 114 may be configured with field recognition engine 120 and the previously discussed predictive model 118. In embodiments, field recognition engine 120 would receive queried form field label 128 associated with User 2. Field recognition engine 120 may be configured to utilize queried form field label 128 and predictive model 118 to determine one or more form field label synonyms for queried form field label 128. This may be accomplished by utilizing predictive model 118 that has been trained as described above to correlate the queried form field label 128 with one or more form field labels that are synonymous with the queried form field label 128.

In some embodiments, field recognition engine 120 may then be configured to utilize these synonyms of the queried form field label 128 to determine predicted form field values 130 for queried form field label 128. To accomplish this, field recognition engine 120 may be configured to take the form field label synonyms determined by predictive model 118 and compare the form field label synonyms with User 2's form field profile contained within global record 112. If any of the form field label synonyms match form field labels included within User 2's form information from global record 112, then the form field values associated with those form field labels may be retrieved by field recognition engine 120 as predicted form field values 130. These predicted form field values 130 can then be returned to web application server 126. In other embodiments, even if a form field label is present in the form field profile for User 2, the form field label may still be submitted to application server 114 as queried form field label 128. In such embodiments, field recognition engine 120 and predictive model 118 may be utilized to augment the form field value associated with the form field label. For example, if a user encountered a form field label of "Fore Name," for which the user had previously only entered a value of Bill, but had previously entered a value of both Bill and William for a synonym of "Fore Name", e.g., "First Name," it might be desirable to show Bill as one predicted form field value and William as a second predicted form field value. As such, the field recognition engine 120 can be configured to utilize the predictive model 118 to identify synonyms of a queried form field label 128 and utilize those synonyms to predict additional values that have not been previously submitted by the user in response to the queried form field label but have been submitted in response to synonyms of the queried form field label.

In embodiments where the form field values for User 2 are obfuscated within global record 112, these obfuscated values may be the predicted form field values that are returned to web application server 126. In such embodiments, web application server 126 may be configured to resolve these obfuscated form field values to produce the actual form field values. Such a resolution may be accomplished, for example, by dehashing via a reverse hash lookup and/or decrypting the obfuscated value. In other embodiments, the hashed value may be compared against hashes of values within the form field profile of User 2 to resolve the obfuscated form field value.

In other embodiments, field recognition engine 120 may merely formulate a list of form field label synonyms for the queried form field label. In such embodiments, this list of form field label synonyms could be returned instead of predicted form field values 130. In such embodiments, web application server 126 may be configured to compare the form field label synonyms, from the list of form field label synonyms, with the form field labels contained within User 2's form field profile. If any of the list of form field label synonyms match form field labels included within User 2's form field profile, then the form field values associated with those form field labels may be retrieved by web application server 126 as predicted form field values. These predicted form field values can then be presented to the user in the generated form 132 for selection of at least one of these predicted form field values by User 2.

Regardless of how the predicted form field values are arrived at, where multiple predicted form field values are determined, the predicted form field values may be presented to User 2 in a ranked order depending on the confidence value associated with each of the predicted form field values. As such, this ranked order may be based on any number of factors that would be considered in determining the confidence value, including the similarity of the labels; previously mentioned actions; a time at which each predicted form field value was submitted by the user (e.g., older predicted form field values could be assigned a lower rank than more recent predicted form field values); a count of the number of form field label synonyms that are associated with the predicted form field value, a context of the queried form field label (e.g., in the context of other values that have been entered on form 132), or any other suitable factors. In some embodiments, these factors may be weighted to ensure proper ranking. In such embodiments, the weighting of each factor could be determined via, for example, any suitable machine learning algorithm.

To provide an example of the above mentioned context, suppose the user has previously filled out two forms with varying form field values. In a first form the user has entered the form field value "abc" for a form field label of "name" and the form field value "s_abc" for the form field label of "school." In the second form the user has entered the form field value "xyz" for a form field label of "name" and the form field value "s_xyz" for the form field label of "school." If, in the current form, the user has already filled out a value "abc" for name, then the value "s_abc" for school would be ranked higher than "s_xyz" in light of this context. In embodiments, this context sensitive ranking can be accomplished by creating a graph structure similar to the one created during the preprocessing described above, except that this graph will map connections between form field values within a same form. Running a training algorithm such as, for example, PageRank or SimRank on this graph, or a graph clustering algorithm that determines form field values that co-occur frequently, can provide us similarity between values in the context of the form.

In some embodiments, the highest ranked predicted form field value may be auto-populated into the form field value entry point on form 132 that is associated with queried form field label 128. In such embodiments, the remaining predicted form field values may be displayed for selection by the user upon the user selecting the form field value entry point, which could indicate that the user intends to change the auto-populated value.

If no predicted form field values exist, then the user can manually enter a form field value, which would then be utilized to update predictive model 118, in a same or similar manner to that described above.

To evaluate the accuracy of the above described predictive model 118, a mean average precision (MAP) metric may be utilized. Such a MAP metric can consider the result of each prediction as a ranked list of items and can measure the overall precision across multiple queried form field labels. In other embodiments where ranking may not need to be considered during evaluation, other metrics like mean reciprocal rank (MRR), normalized discounted cumulative gain (NDCG), accuracy, recall, precision, F-measure, etc. may be utilized. Each of these metrics are known in the art and will not be described further herein.

To evaluate a predictive model in a larger setting on real users, we can perform A/B testing with different predictive models. Such an embodiment could start with a basic predictive model that just considers synonymous form field labels based on the similarity of associated form field values and another predictive model that is more complex and takes additional aspects into account to see which performs better. To evaluate the performance of a model, each user may be assigned to a cohort (say 5%) and that cohort may be assigned to one of the two predictive models. For each predictive model measurements for the following could be tracked: R which represents a rank of the predicted form field value the user chose from a ranked list of predicted form field values; FP which represents whether a user chose a form field value other than that predicted (e.g., via manual entry); miss if the model assigned to the cohort fails to produce a predicted form field value, but the other model did produce a predicted form field value; and miss2 if both models failed to produce a predicted form field value. For a model to perform well, the distribution of R with respect to the model should be long tailed with higher ranks getting lesser area, relative FP should be low, and relative miss should be low. Miss2 can be used as a measure of uniqueness of values.

In embodiments, a metric of the following form can be used:

$$u(m) = \left[ \frac{n_1}{(n_2+1) \cdot \log 3 + (n_3+1) \cdot \log 4} \right] \cdot \frac{1}{FP_R + 1 \cdot Miss_R + 1}$$

where $n_i$ is the number of times rank i was selected, $FP_R$ and $Miss_R$ are relative false positive and miss scores. From this metric, the model which performs better can be decided upon using a z-test, which is known in the art. Once a winning model is selected, we can remove the losing model and introduce another in its place and continue to iterate to see which model performs the best in real settings. In other embodiments, the winning model and the losing model could be combined to generate a combined predictive model that integrates aspects of both models. In other embodiments a technique called 'Multi armed bandits' can be utilized to evaluate the predictive model. This technique is known in the art and will not be discussed in further detail herein.

Figure 2:
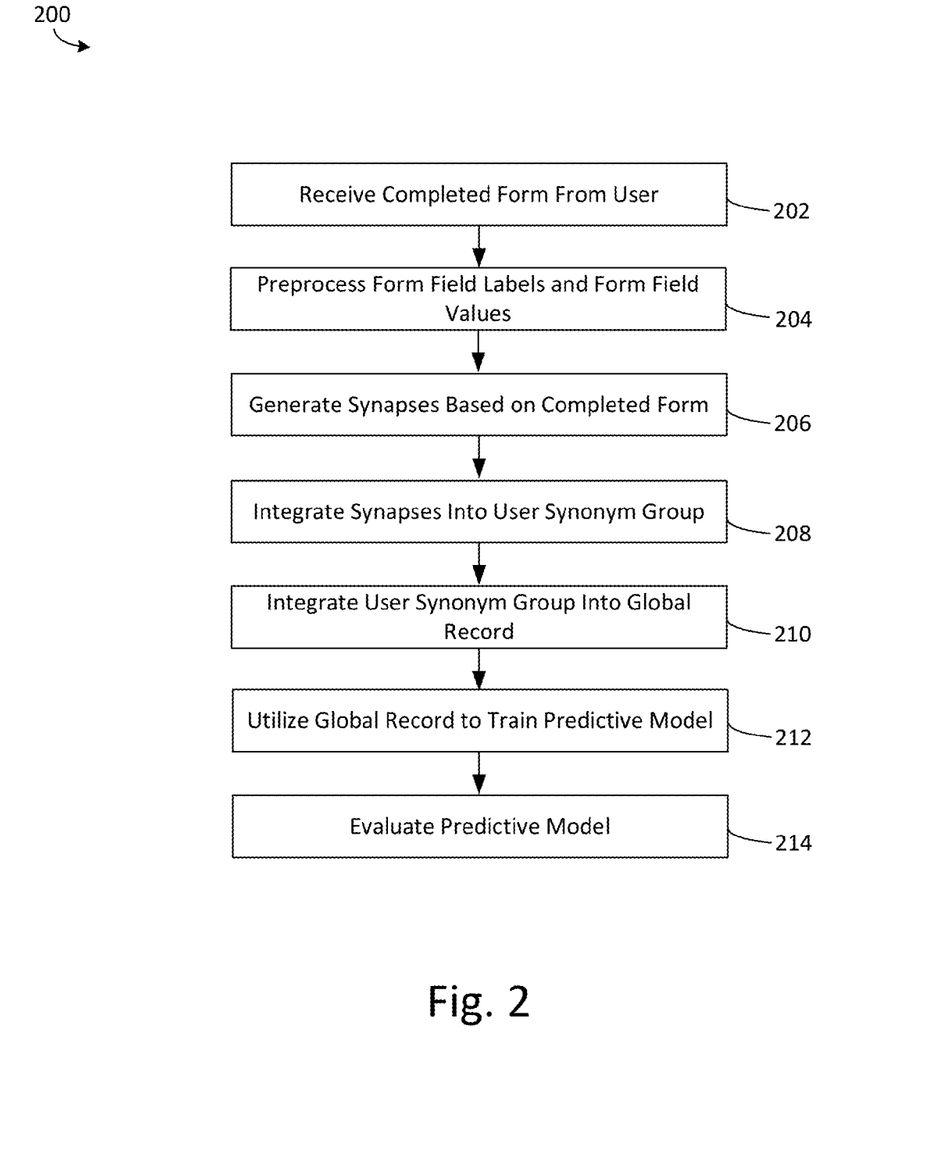
FIG. 2 is an illustrative flow diagram for generating a predictive model in accordance with various embodiments of the present disclosure.

FIG. 2 depicts an illustrative process flow 200 showing a method for training a predictive model capable of predicting form field values for a user in accordance with various embodiments of the present disclosure. Portions of process flow 200 may be carried out, for example, by components depicted in computing environment 100.

The depicted process flow can begin at block 202 where a completed electronic form (e.g., form 104 of FIG. 1) is received from a user. The electronic form may be in the format of a hypertext markup language (HTML) form, an Adobe® fillable portable document format (PDF) form, or any other suitable format including image formats. The form may represent, for example, a contact form, a survey form, an event registration form, an order form, or any other suitable electronic form.

The completed form may include a plurality of form field labels (e.g., form field labels 134 and 136 of FIG. 1). Each of the plurality of form field labels may be respectively associated with a form field value (e.g., form field values 138 and 140 of FIG. 1). Each of the form field values can be submitted by the user in response to the respectively associated form field label. As used herein, submitted by the user includes both active entry of the form field value (e.g., via manual entry on a keyboard), semi-active entry of the form field value (e.g., selection of the form field value from a pre-populated list of form field values), or passive entry (e.g., the field label value is automatically populated and the user accepts the automatically populated value).

At block 204, the form field labels and form field values may be preprocessed. This preprocessing may include any processing to the form field labels and/or the form field values. Such pre-processing is discussed extensively in reference to FIG. 1 above and could include obfuscation of form field values and/or form field labels, as described above; normalization of form field labels as described above; NLP processing, as described above, and/or de-duplication, as described above.

At block 206 a set of synapses (e.g., synapses 108) may be generated from the completed form. As previously mentioned, a synapse includes an association between a form field label and a form field value. As such, generating the synapses could merely include associating each form field label of the completed form with a respective form field value of the completed form. In other embodiments, synapses may include addition data, or metadata, as described above.

At block 206, the synapses generated from the completed form may be integrated into synonym groups of form field labels for the user. These synonym groups may be formed by generating a user specific graph that groups form field labels based on the form field values entered by the user. This graph may be an undirected graph in some embodiments, or a directed graph in other embodiments, having a node for each form field label and a node for each respective form field value. In such embodiments, in instances where the form field values have not been obfuscated, the nodes that represent form field values that are equal to one another, or within a threshold of similarity from one other, may be reduced down to a single node in the graph such that form field labels that are associated with a same or similar form field value are all associated with the same node within the user specific graph.

The threshold of similarity mentioned above may be a predefined, or preconfigured, threshold and any conventional string analysis mechanisms (e.g., Levenshtein distance, discussed previously) may be utilized to determine the similarity between two strings.

The synonym groupings of an individual user, while beneficial in predicting a form field value for that user when given a form field label that exists in the user's synonym groupings, are not useful in predicting a form field value for a form field label that is absent from the user's synonym groupings. As such, in order to enable prediction of form field values for form field labels that are absent from a user's synonym groupings, synonym groupings from multiple users may be integrated into a global record (e.g., global record 112) at block 210.

At block 212, the global record may be processed, to generate, or train, a predictive model (e.g., predictive model 118 of FIG. 1) that enables prediction of at least one form field value for a user when given a queried form field label that is absent from the user's synonym groupings. To accomplish this, the predictive model may correlate the synonym groupings of one user with those of one or more additional users as described in reference to FIG. 1.

To generate, or train, the predictive model any suitable training algorithms may be utilized to correlate form field label synonyms between the synonym groupings. Examples of such training algorithms that can be utilized to accomplish this are PageRank and SimRank. These algorithms are known in the art and are merely included as examples of possible algorithms. It will be appreciated that the above mentioned algorithms are merely meant to illustrate possible examples and that any number of algorithms may be utilized in training. Finally, at block 214, the predictive model generated above may be evaluated for accuracy. Such an evaluation is described in detail in reference to FIG. 1.

The above described process can be utilized to initially generate a predictive model or to update an existing predictive model as additional synapses are generated. Updating of a predictive model may occur in real time, or on a periodic basis (e.g., weekly, biweekly, monthly, etc.).

Figure 3:
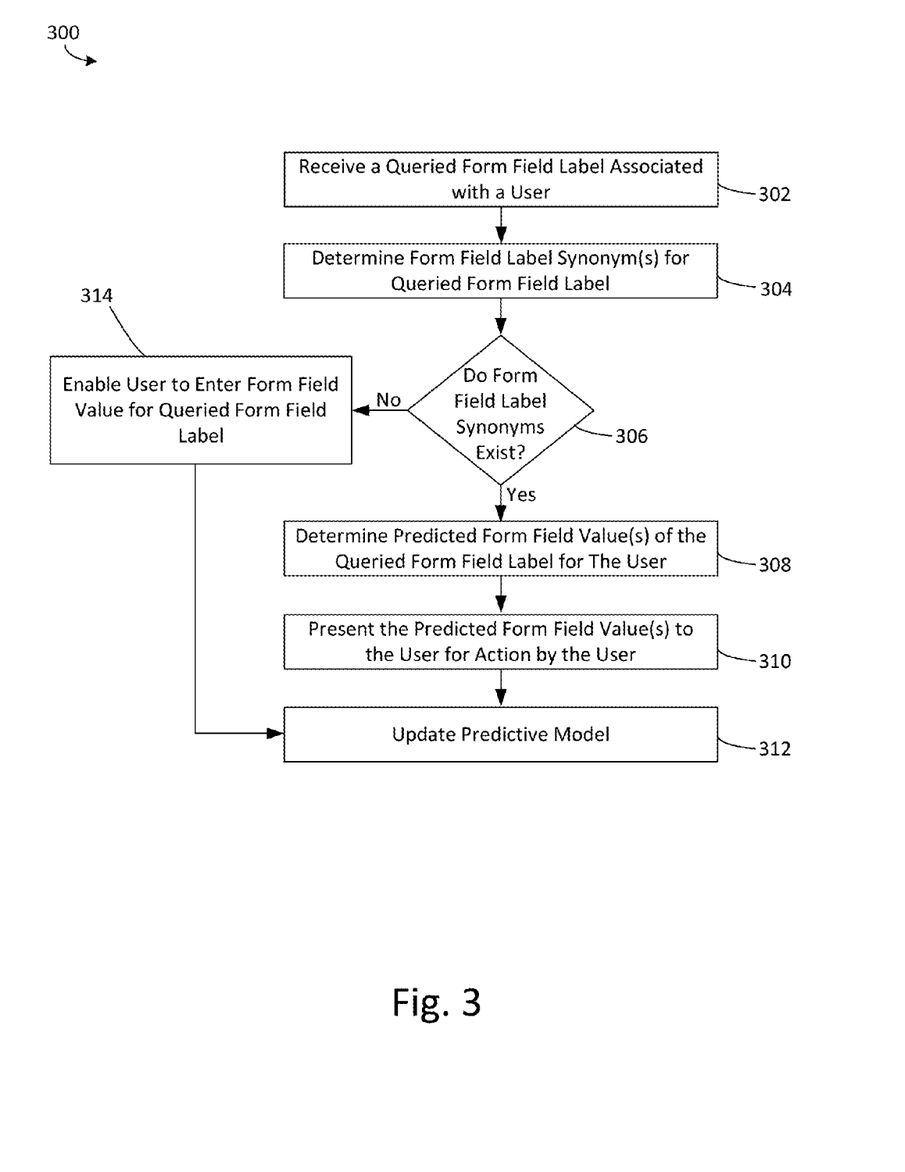
FIG. 3 is an illustrative flow diagram for predicting form field values in accordance with various embodiments of the present disclosure.

FIG. 3 is an illustrative flow diagram 300 for predicting form field values in accordance with various embodiments of the present disclosure. Portions of process flow 300 may be carried out, for example, by components depicted in computing environment 100.

The depicted process flow can begin at block 302 where a queried form field label is received. At block 304, form field label synonyms are determined for the queried form field label. In embodiments, this may be accomplished utilizing the queried form field label in conjunction with the predictive model discussed elsewhere herein.

At block 306, a decision is made as to whether any form field synonyms were able to be determined at block 304. If no form field label synonyms were able to be determined, then the process flow 300 proceeds to block 314 where the user manually enters a form field value for the queried form field label. From block 314, the process flow 300 proceeds to block 312 where the predictive model is updated utilizing the form field value entered by the user and based on the user's action of manually entering the form field value. The updating of the predictive model may occur in a same or similar manner to that described above in reference to FIGS. 1 and 2.

Returning to block 306, if form field label synonyms do exist for the queried form field label, then, at block 308, the form field label synonyms may be utilized to determine predicted form field values for the queried form field label. To accomplish this, the form field label synonyms may be compared with form field labels within the user's form field profile. If any of the form field label synonyms match form field labels included within the user's form field profile, then the form field values associated with those form field labels may be retrieved as predicted form field values.

At block 310, the predicted form field values are presented to the user for action by the user. Where multiple predicted form field values are determined, the predicted form field values may be presented to the user in a ranked order. As mentioned previously in reference to FIG. 1, such a ranked order may be based on any number of factors, including the similarity of the labels; previously mentioned actions; a time at which each predicted form field value was submitted by the user (e.g., older predicted form field values could be assigned a lower rank than more recent predicted form field values); a count of the number of form field label synonyms that are associated with the predicted form field value, a context of the queried form field label (e.g., in the context of other values that have been entered on form), or any other suitable factors. In some embodiments, these factors may be weighted to ensure proper ranking. In such embodiments, the weighting of each factor could be determined via, for example, any suitable machine learning algorithm.

In some embodiments, the highest ranked predicted form field value may be presented to the user by auto-populating this form field value into the form field value entry point on the form that is associated with queried form field label. In such embodiments, the remaining predicted form field values may be displayed for selection by the user, upon the user selecting the form field value entry point, which could indicate that the user intends to change the auto-populated value.

Figure 4:
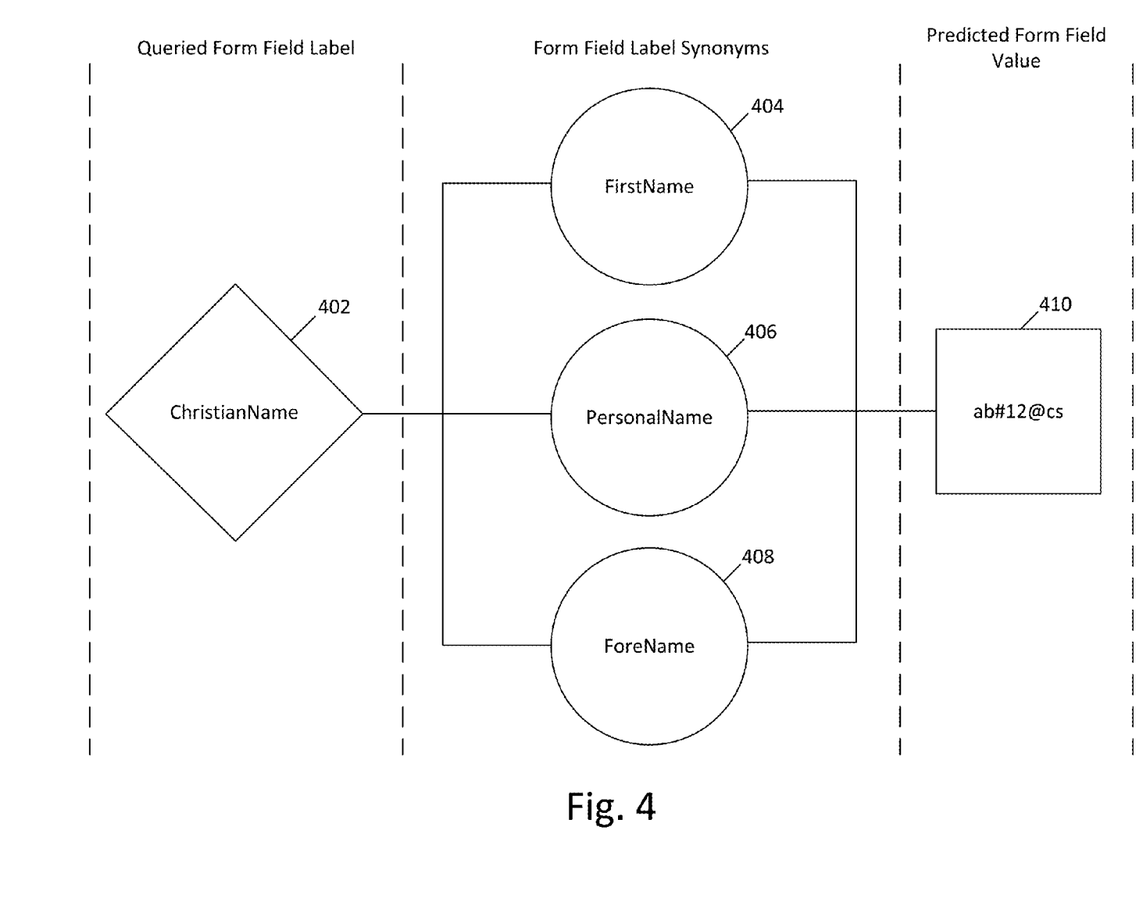
FIG. 4 is an illustrative depiction of an example correlation from a query form field label to a predicted form field value in accordance with various embodiments of the present disclosure.

FIG. 4 is an illustrative depiction of an example correlation from a queried form field label 402 to a predicted form field value 410 for a user in accordance with various embodiments of the present disclosure. As can be seen, form field synonyms 404-408 have been determined for queried form field label 402. This determination can be made utilizing the queried form field label in conjunction with a predictive model, as discussed above. In this embodiment, all of form field synonyms 404-408 are included in the user's form field profile and are associated with the same form field value 410. As such, it can be determined with a high degree of confidence that form field value 410 is an accurate predicted form field value. As depicted, form field value 410 has been obfuscated in a manner as described above, thus, to utilize predicted form field value 410, the predicted form field value will have to be resolved to produce the actual form field values. Such a resolution may be accomplished, for example, by dehashing and/or decrypting the obfuscated value.

Figure 5:
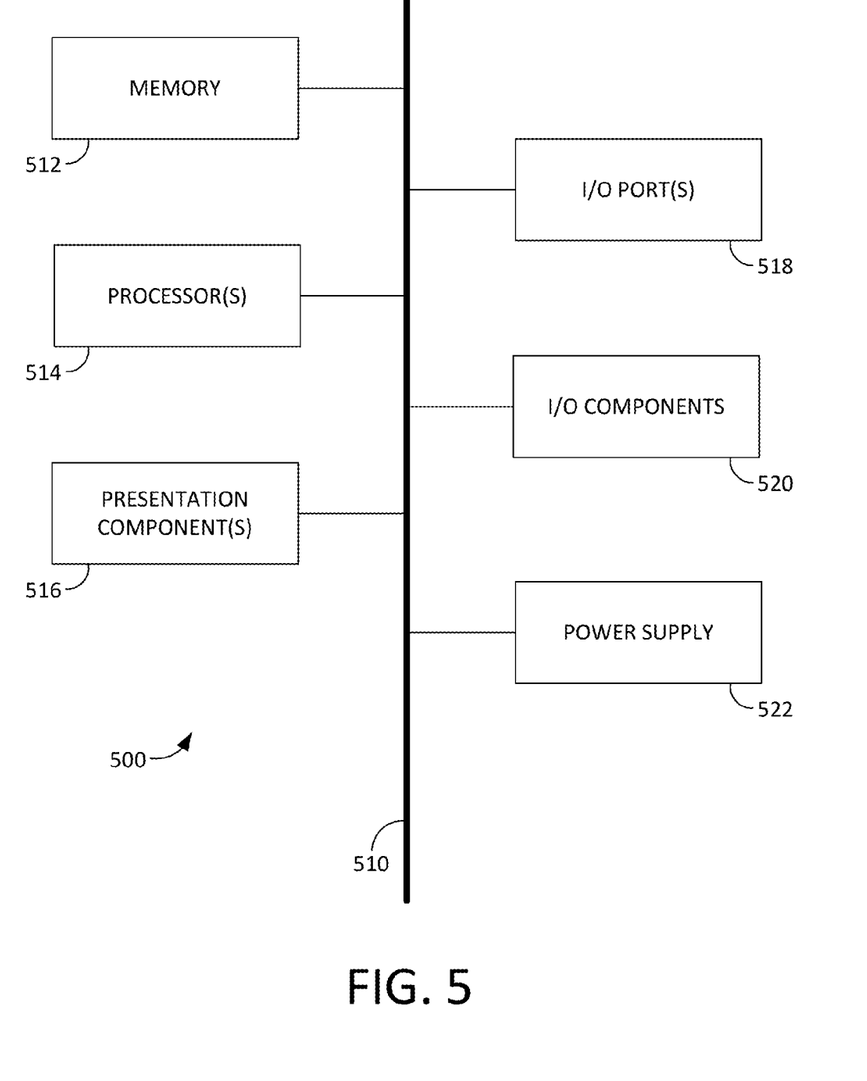
FIG. 5 is a block diagram of an example computing device in which embodiments of the present disclosure may be employed.

Having described embodiments of the present invention, an example operating environment in which embodiments of the present invention may be implemented is described below in order to provide a general context for various aspects of the present invention. Referring to FIG. 5, an illustrative operating environment, or computing platform, for implementing embodiments of the present invention is shown and designated generally as computing device 500. Computing device 500 is but one example of a suitable computing environment and is not intended to suggest any limitation as to the scope of use or functionality of the invention. Neither should the computing device 500 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialized computing devices, etc. The invention may also be practiced in distributed computing environments where tasks are performed by remote-processing devices that are linked through a communications network.

With reference to FIG. 5, computing device 500 includes a bus 510 that directly or indirectly couples the following devices: memory 512, one or more processors 514, one or more presentation components 516, input/output (I/O) ports 518, I/O components 520, and an illustrative power supply 522. Bus 510 represents what may be one or more busses (such as an address bus, data bus, or combination thereof). Although depicted in FIG. 5, for the sake of clarity, as delineated boxes that depict groups of devices without overlap between these groups of devices, in reality this delineation is not so clear cut and a device may well fall within multiple ones of these depicted boxes. For example, one may consider a display to be one of the one or more presentation components 516 while also being one of the I/O components 520. As another example, processors have memory integrated therewith in the form of cache; however, there is no overlap between the one or more processors 514 and the memory 512. A person having of skill in the art will readily recognize that such is the nature of the art, and it is reiterated that the diagram of FIG. 5 merely depicts an illustrative computing device that can be used in connection with one or more embodiments of the present invention. It should also be noticed that distinction is not made between such categories as "workstation," "server," "laptop," "handheld device," etc., as all such devices are contemplated to be within the scope of computing device 500 of FIG. 5 and any other reference to "computing device," unless the context clearly indicates otherwise.

Computing device 500 typically includes a variety of computer-readable media. Computer-readable media can be any available media that can be accessed by computing device 500 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 500. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer-storage media in the form of volatile and/or nonvolatile memory. The memory may be removable, non-removable, or a combination thereof. Typical hardware devices may include, for example, solid-state memory, hard drives, optical-disc drives, etc. Computing device 500 includes one or more processors 514 that read data from various entities such as memory 512 or I/O components 520. Presentation component(s) 516 present data indications to a user or other device. Illustrative presentation components include a display device, speaker, printing component, vibrating component, etc.

I/O ports 518 allow computing device 500 to be logically coupled to other devices including I/O components 520, some of which may be built in. Illustrative components include a keyboard, mouse, stylus, a drawing tablet, a microphone, joystick, game pad, satellite dish, scanner, printer, wireless device, etc. The I/O components 520 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described elsewhere herein) associated with a display of the computing device 500. The computing device 500 may be equipped with depth cameras, such as stereoscopic camera systems, infrared camera systems, RGB camera systems, touchscreen technology, and combinations of these, for gesture detection and recognition. Additionally, the computing device 500 may be equipped with accelerometers or gyroscopes that enable detection of motion. The output of the accelerometers or gyroscopes may be provided to one or software modules or applications that may cause the display of the computing device 500 to render immersive augmented reality or virtual reality.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)."

The phrase "at least one of A, B and C" means "(A), (B), (C), (A and B), (A and C), (B and C) or (A, B and C)."

What is claimed is:

1. One or more non-transitory computer-readable media having instructions embodied thereon, wherein the instructions, when executed by one or more processors of a computing device, enable the computing device to automatically update electronic forms to include predicted values, by causing the one or more processors to:
receive a first form field profile associated with a first user and a plurality of additional form field profiles associated with a plurality of additional users, wherein the first user is a user of the computing device;
generate a predictive model based on the first form field profile and the plurality of additional form field profiles, wherein the predictive model enables determination of a plurality of predicted form field values based on a plurality of correlations within at least the plurality of additional form field profiles;
receive a form field label associated with an electronic form being completed by the first user in response to determining that the received form field label is absent from the first form field profile associated with the first user, employ the predictive model to identify a first correlation of the plurality of correlations, wherein the first correlation correlates the received form field label with one or more synonymous form field labels within the plurality of additional form field profiles;
determine a first predicted form field value, of the plurality of predicted form field values and for the received form field label, based on the identified first correlation and the first form field profile associated with the first user; and
automatically update the electronic form, such that the updated electronic form includes and associates the first predicted form field value with the received form field label.

2. The one or more computer-readable media of claim 1, wherein the plurality of correlations include correlations of first synonym groupings of the first user with one or more additional synonym groupings of the plurality of additional users.

3. The one or more computer-readable media of claim 1, wherein determination of the first predicted form field value for the received form field label includes determining at least a portion of the plurality of predicted form field values, providing the portion of the plurality of predicted form field values to the first user, and enabling the first user to select the first predicted form field value from the portion of the plurality of predicted form field values.

4. The one or more computer-readable media of claim 3, wherein an order of the plurality of predicted form field values is based on a confidence level associated with each of the plurality of predicted form field values.

5. The one or more computer-readable media of claim 3, wherein an order of the plurality of predicted form field values is based on one or more other form field values of a form being completed by the first user.

6. The one or more computer-readable media of claim 3, wherein an order of the plurality of predicted form field values is based on a confidence level associated with each of the plurality of predicted form field values, and the confidence level is based on a measure of a number of synonymous form field labels that are associated with each of the plurality of predicted form field values.

7. A computer-implemented method of automatically updating an electronic form to include predicted values comprising:
receiving a first form field profile associated with a first user and a plurality of additional form field profiles associated with a plurality of additional users;
forming first synonym groups of first form field labels for the first user based on an analysis of similarity of first form field values that are associated with the first form field labels, wherein the first form field values are included in the first form field profile associated with the first user;
generating a predictive model based on the first form field profile and the plurality of additional form field profiles, wherein the predictive model correlates the first synonym groupings with one or more additional synonym groupings, wherein the additional synonym groupings are based on one or more additional form field labels that are included in the plurality of additional form field profiles associated with the plurality of additional users, and the correlating is based, at least in part, on the first form field labels, the additional form field labels, and the one or more additional synonym groupings;
in response to determining that a queried form field label of the electronic form is absent from the first form field labels, employ the predictive model to determine one or more predicted form field values for the first user, wherein the queried form field label is included in the one or more additional form field labels; and
automatically updating the electronic form, such that the updated electronic form includes and associates the one or more predicted form field values with the queried form field label.

8. The method of claim 7, wherein forming the first synonym groupings of the first form field labels comprises:
generating a first graph that includes label nodes for each of the first form field labels, value nodes for each of the first form field values, and edges connecting the label nodes with respective value nodes; and
combining value nodes of the first graph that are within a level of similarity from one another into a single node.

9. The method of claim 7, wherein correlating the first synonym groupings with the one or more additional synonym groupings comprises incorporating the first synonym groupings and the one or more additional synonym groupings into a global graph.

10. The method of claim 7, wherein generating the predictive model comprises performing a PageRank process to determine a similarity between the first form field labels and the additional form field labels.

11. The method of claim 7, wherein forming the first synonym groupings of the first form field labels further comprises normalizing the first form field labels.

12. The method of claim 7, wherein forming the first synonym groupings of the first form field labels further comprises deduplicating the first form field labels.

13. The method of claim 7, further comprising:
obfuscating the first form field values in a manner specific to the first user.

14. The method of claim 13, wherein obfuscating the first form field values includes encryption of the first form field values utilizing an encryption key specific to the first user.

15. The method of claim 13, wherein obfuscating the first form field values includes hashing of the first form field values utilizing a seed specific to the first user.

16. The method of claim 7, further comprising:
obfuscating the first form field labels in a user independent manner, wherein the additional form field labels are obfuscated in the same manner such that the obfuscated first form field labels and the obfuscated additional form field labels are capable of comparison against one another based on similarity.

17. A computing system for automatically updating electronic forms to include predicted values comprising:
one or more processors;
a computer-readable storage medium, coupled with the one or more processors, having instructions stored thereon, which, when executed by the one or more processors, perform actions comprising:
receiving a first form field profile associated with a first user and a plurality of additional form field profiles associated with a plurality of additional users, wherein the first user is a user of the computing device;
generating a predictive model based on the first form field profile and the plurality of additional form field profiles, wherein the predictive model correlates a plurality of form field labels based on a plurality of synonym groupings that are each associated with at least one of the first user or the plurality of additional users;
in response to determining that a queried form field label, of an electronic form being completed by the first user, is absent from the first form field profile, utilizing the predictive model to determine one or more form field labels within the plurality of synonym groupings that are synonymous with the queried form field label and associated with at least one of the plurality of additional users;
determine at least one predicted form field value for the queried form field label utilizing the synonymous one or more form field labels and the first form field profile of the first user; and
automatically update the electronic form, such that the updated electronic form includes and associates the at least one predicted form field value with the queried form field label.

18. The computing system of claim 17, wherein each of the plurality of synonym groupings includes a group of form field labels of the plurality of form field labels that have been correlated based on an analysis of similarity between form field values submitted by the plurality of additional users in response to each of the form field labels of the group of form field labels.

19. The computing system of claim 17, wherein determining the at least one predicted form field value includes determining a plurality of predicted form field values and causing the plurality of predicted form field values to be provided to the first user for selection of one of the predicted form field values.

20. The computing system of claim 19, wherein an order of the plurality of predicted form field values is based on a confidence level associated with each of the plurality of predicted form field values.

* * * * *